United States Patent [19]

Smolinske

[11] Patent Number: 5,655,218
[45] Date of Patent: Aug. 5, 1997

[54] RADIOTELEPHONE COMMUNICATION UNIT DISPLAYING CHRONOLOGICAL INFORMATION

[75] Inventor: Jeffrey C. Smolinske, Hoffman Estates, Ill.

[73] Assignee: Motorola, Inc., Schaumburg, Ill.

[21] Appl. No.: 602,385

[22] Filed: Feb. 16, 1996

Related U.S. Application Data

[63] Continuation of Ser. No. 282,661, Jul. 29, 1994, abandoned.
[51] Int. Cl.$^6$ ............................................. H04B 1/00
[52] U.S. Cl. ........................ 455/566; 455/412; 455/435
[58] Field of Search ................................. 455/32.1, 38.2, 455/38.3, 38.4, 53.1, 54.1, 54.2, 56.1, 67.7, 70, 89, 158.3, 158.4, 343; 370/94.1; 340/825.44, 311.1; 379/58–59; 368/10, 47

[56] References Cited

U.S. PATENT DOCUMENTS

| | | | |
|---|---|---|---|
| 4,713,808 | 12/1987 | Gaskill et al. | 370/94.1 |
| 5,265,070 | 11/1993 | Menowa | 368/47 |
| 5,297,120 | 3/1994 | Yuzuki et al. | 368/47 |
| 5,309,500 | 5/1994 | Koma et al. | 379/58 |

FOREIGN PATENT DOCUMENTS

| | | | |
|---|---|---|---|
| 0427515 | 5/1991 | European Pat. Off. | 368/47 |
| 4-105094 | 4/1992 | Japan | 368/47 |
| 9116670 | 10/1991 | WIPO | 368/47 |

*Primary Examiner*—Reinhard J. Eisenzopf
*Assistant Examiner*—Marsha D. Banks-Harold
*Attorney, Agent, or Firm*—Heather L. Creps

[57] ABSTRACT

A radio communication system (100) employs a method (300) and apparatus (103) for providing chronological information to a communication unit (103). A base site (101) of the radio communication system (100) determines (303) the chronological information (e.g., time and date). The base site (101) transmits (305) the chronological information in a portion of a system control signal (107) to the communication unit (103). The communication unit (103) receives (311) the chronological information and maintains (313) the chronological information for use (315, 317) by a user of the communication unit (103).

5 Claims, 1 Drawing Sheet

RADIOTELEPHONE COMMUNICATION UNIT DISPLAYING CHRONOLOGICAL INFORMATION

This is a continuation of application Ser. No. 08/282,661, filed Jul. 29, 1994 and now abandoned.

FIELD OF THE INVENTION

The present invention relates generally to radio communication systems and, in particular, to a method and apparatus for providing chronological information to a communication unit in a radio communication system.

BACKGROUND OF THE INVENTION

Radio communication systems are known to comprise one or more base sites that respectively support radio communications for a plurality of communication units. Depending on the type of system (e.g., cellular, trunked two-way, or paging), the communication units might comprise mobile or portable radiotelephones, mobile or portable two-way radios, or selective call receivers (i.e., pagers). In a two-way communication system, each communication unit that desires to communicated registers in the communication system and is assigned to a base site. The base site informs each of the communication units in its coverage area of system conditions (e.g., channel availability, channel allocation, system authorization, etc.) by transmitting system information in a system control signal. In a paging system, registration is assumed and the base site similarly transmits system information to the pagers in its coverage area via a system control signal.

Communication units, such as cellular telephones, typically include a display for visually displaying information (e.g., a telephone number, received signal strength, etc.) to a user of the communication unit. In addition, some communication units also display chronological information to their users. Display of the chronological information permits the user to obtain the current time and date from the communication unit when the communication unit is powered on and operable. To generate the chronological information, the communication units typically contain a dedicated electronic clock circuit. The clock circuit generally includes an oscillator, an integrated circuit (IC) having a memory device and a counter, and a battery for providing direct current (DC) power to the integrated circuit and the oscillator. The dedicated integrated circuit and oscillator together generate and maintain the chronological information in the communication unit. However, the dedicated integrated circuit, oscillator, and battery are independent of the power source and other integrated circuits used for primary operation (e.g., transmission, reception, and control) of the communication unit. Consequently, the dedicated components used to produce the chronological information increase the cost, size, and weight of the communication unit.

As is also known in the art, some communication units and base sites are equipped with satellite receivers to receive chronological information periodically broadcast from global positioning satellites. However, similar to the dedicated components discussed above, the inclusion of such a satellite receiver in a communication unit increases the cost, size, weight and complexity of the communication unit.

Therefore, a need exists for a method and apparatus for providing chronological information to a communication unit in a radio communication system that facilitates the use of the chronological information by a user of the communication unit, without requiring additional electronic hardware to generate, or receive, the chronological information as in prior art radio communication units.

DESCRIPTION OF A PREFERRED EMBODIMENT

Generally, the present invention encompasses a method and apparatus for providing chronological information to a communication unit in a radio communication system. A base site of the radio communication system determines the chronological information (e.g., time and date). The base site transmits the chronological information in a portion of a system control signal to the communication unit. The communication unit receives the chronological information and maintains (e.g., stores and updates) the chronological information for use by a user of the communication unit. By providing the chronological information to the communication unit in this manner, the present invention facilitates access to chronological information by a user of the communication unit, without requiring dedicated electronic hardware to generate, or receive (as with a GPS receiver), the chronological information at the communication unit as in prior art approaches.

Figure 1:
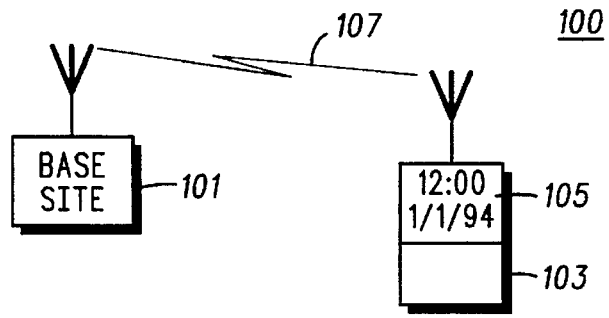
FIG. 1 illustrates a radio communication system that might employ the present invention.

The present invention can be more fully described with reference to FIGS. 1–3. FIG. 1 illustrates a radio communication system 100 that employs the present invention. The radio communication system 100 includes a fixed base site 101 and a communication unit 103. In a preferred embodiment, the communication unit 103 includes a display 105 for displaying the chronological information to a user (not shown) of the communication unit 103. Although only one communication unit 103 is shown, multiple communication units might be serviced by a single base site 101 as is known in the art.

The radio communication system 100 preferably comprises a two-way communication system, such as some of those proposed for the domestic Personal Communications System (PCS). In an alternate embodiment, the radio communication system 100 might comprise a code division multiple access (CDMA) system, such as the system defined by Telecommunications Industry Association/Electronics Industries Association Interim Standard 95 (TIA/EIA IS-95), a time division multiple access (TDMA) system, such as the domestic system set forth in TIA/EIA IS-54 or the Global System for Mobile communications (GSM), or a frequency division multiple access (FDMA) system, such as the system set forth in TIA/EIA IS-3-D. In yet another embodiment, the radio communication system 100 might comprise a one-way communication system, such as a paging system.

The communication unit 103 preferably comprises a mobile or portable radiotelephone, a mobile or portable radio, or a selective call receiver (e.g., a pager). As noted above, the communication unit 103 preferably includes a display 105, such as a light emitting diode (LED) display, a liquid crystal display (LCD), or a known voice synthesized, audible display.

Operation of the radio communication system 100 in accordance with a preferred embodiment of the present invention occurs in the following manner. When a user of the communication unit 103 desires to become active in the radio communication system 100, the user actuates the communication unit 103—for example, by depressing a power button or turning a power switch. The communication unit 103 then monitors a system control signal 107 transmitted by the base site 101. In a preferred embodiment, the system control signal 107 contains the chronological information. However, in an alternate embodiment, the chronological information might be transmitted in a communication signal distinct from the system control signal 107. The chronological information comprises either time information, date information, or both. The communication unit 103 receives the chronological information and maintains the chronological information as discussed below. While maintaining the chronological information, the communication unit 103 continually, or periodically, displays the chronological information to the user of the communication unit 103 via the display 105.

Figure 2:
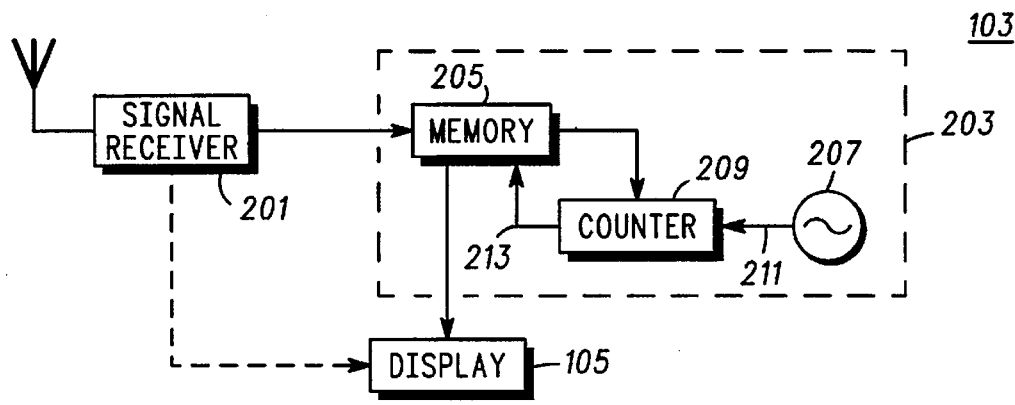
FIG. 2 illustrates a communication unit in accordance with the present invention.

FIG. 2 illustrates a communication unit 103 in accordance with the present invention. The communication unit 103 comprises a signal receiver 201, means for maintaining chronological information 203, and the display 105. The signal receiver 201 preferably comprises well-known receiver front-end and backend circuitry applicable to the particular type of communication system, such as filters, frequency down converters, a local oscillator, analog-to-digital converters, and signal processing circuitry (e.g., a microprocessor and/or a digital signal processor).

The means for maintaining 203 preferably comprises a memory device 205, an oscillator 207, and a counter 209. The memory device 205 preferably comprises a random access memory (RAM). While illustrated as a separate element in the means for maintaining 203, the oscillator 207 preferably comprises the frequency adjustable local oscillator contained in the signal receiver 201. The counter 209 is preferably implemented using a microprocessor. In a preferred embodiment, the counter 209 and the memory device 205 are collocated in an integrated circuit that is used for a variety of functions, such as signal processing in the signal receiver 201 and executing control functions in the communication unit 103. In the preferred embodiment, the oscillator 207 and the integrated circuit containing the counter 209 and the memory device 205 are supplied with DC power from the power source (e.g., battery) that sources the complete communication unit 103. Thus, the present invention utilizes existing electronic hardware in the communication unit 103 to implement a clock circuit, in contrast to the utilization of a separate clock circuit as in prior art communication units.

Operation of the communication unit 103 in accordance with the present invention occurs as follows. The signal receiver 201 receives the system control signal—including the chronological information, processes the system control signal in accordance with known techniques, and provides a digital representation of the chronological information to the memory device 205. The memory device 205 stores the chronological information and provides the chronological information to the counter 209. The counter 209 determines an appropriate update interval for the chronological information based on a reference clock signal 211 generated by the oscillator 207 and provides an update signal 213 back to the memory device 205 to direct the memory device 205 to update its stored chronological information. In a preferred embodiment, the counter 209 monitors the rising edges of the reference clock signal 211 and provides the update signal 213 based on the number of rising edges measured in a particular time interval. For example, when the chronological information is time, the counter 209 might send a time update signal 213 every second after measuring an appropriate number of rising edges. In an analogous manner, when the chronological information is the date, the counter 209 sends a date update signal 213 after counting the appropriate number of rising edges that correspond to a time interval of 24 hours. In an alternate embodiment, the counter 209 might monitor other portions of the reference clock signal—for example, falling edges.

The memory device 205 updates the stored chronological information in response to the update signal 213 provided by the counter 209 and provides the chronological information to the display 105 at predetermined intervals of time (e.g., every second for the time and every 24 hours for the date). The display 105 then either visually or audibly displays the chronological information to the user of the communication unit 103. In an alternate embodiment, the signal receiver 201 might provide the received chronological information directly to the display 105 as the chronological information is received, thereby obviating a need for the maintaining means 203. However, this alternate approach is only usable while the communication unit 103 is within a coverage area of a radio communication system and it requires that the update interval of the display 105 be substantially identical to the transmission interval of the chronological information from a base site. In either case (store and update or immediate display), the present invention allows battery power of the communication unit 103 to be conserved while still providing a user of the communication unit 103 accurate chronological information when the communication unit is powered on and operable. By receiving the chronological information from a base site upon user actuation of the communication unit 103, the communication unit 103 does not need to use precious battery power to continually maintain the chronological information when the communication unit 103 is de-actuated.

Figure 3:
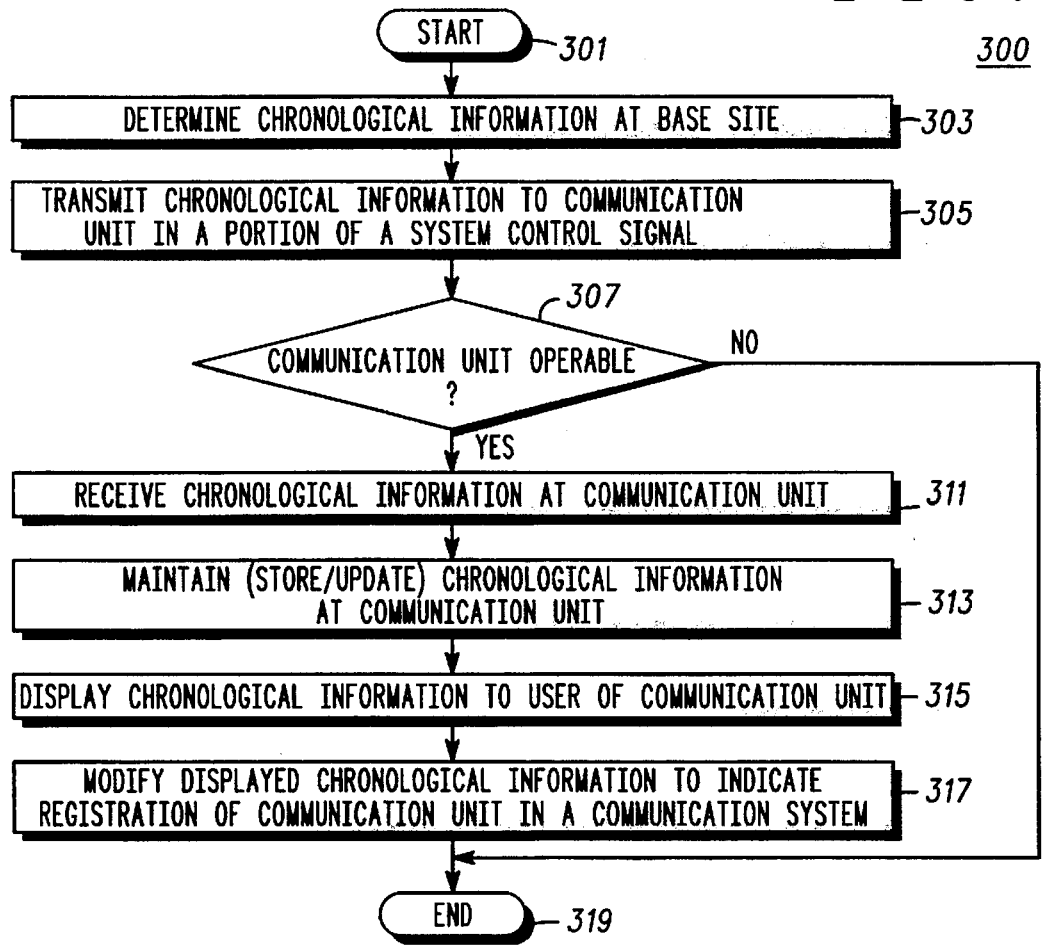
FIG. 3 illustrates an exemplary logic flow diagram of steps executed by a base site and a communication unit in accordance with the present invention.

FIG. 3 illustrates an exemplary logic flow diagram 300 of steps executed by a base site and a communication unit in accordance with the present invention. The logic flow begins (301) when the base site determines (303) chronological information. As noted above, the chronological information might comprise either the time or the date. In a preferred embodiment, the chronological information is locally or remotely downloaded into the base site and the base site maintains the chronological information in a manner similar to that described above for the communication unit. However, in an alternate embodiment, the base site might receive the chronological information, for example, from a global positioning satellite (GPS). Upon determining the chronological information, the base site transmits (305) the chronological information in a portion of a system control signal to the communication units in its coverage area. In a preferred embodiment, this transmission occurs periodically (e.g., every second), although the transmission need not be periodic.

When a communication unit is operable (307), the communication unit receives (311) the chronological information as described above with regard to FIG. 2. However, if the communication unit is inoperable (powered off), the chronological information cannot be received and the logic flow ends (319). After receiving the chronological information, the operable communication unit maintains (e.g., stores and updates) (313) the chronological information and displays (315) the maintained information to a user of the communication unit as detailed above with regard to FIG. 2. In an alternate embodiment of the present invention, the communication unit might modify (317) the displayed information to indicate to the user that the communication unit is registered in a communication system. For example, such a modification might comprise flashing of the colon in a time display to indicate registration in a communication system and a solid colon to indicate system unavailability. Upon modifying the displayed information, the logic flow ends (319).

The present invention encompasses a method and apparatus for providing chronological information to a communication unit in a radio communication system. With this invention, chronological information can be routed to communication units within a wireless communication system. In addition, the present invention provides a technique for deploying chronological information to a communication unit without requiring any additional electronic hardware within the communication unit. The present invention effectively utilizes existing electronic circuitry within the communication unit to perform the auxiliary tasks of receiving and maintaining chronological information transmitted to the communication unit from a base site, thereby obviating the need for dedicated circuitry within the communication unit to acquire and maintain the chronological information as in the prior art. Further, by receiving the chronological information at the communication unit upon user actuation thereof, the communication unit can save battery power, and extend battery life, by maintaining the chronological information only when the communication unit is operable.

What is claimed is:

1. A radiotelephone communication unit comprising:

means for receiving a radio communication signal that includes chronological information;

means for receiving a signal carrying voice information coupled to said means for receiving a radio communication signal;

means, operably coupled to the means for receiving a radio communication signal, for maintaining the chronological information when the radiotelephone communication unit is operable, the means for maintaining comprising:

a memory device for storing the chronological information;

means, operably coupled to the memory device, for updating the chronological information, said means for updating comprising a frequency adjustable oscillator coupled to said means for receiving a signal carrying voice data for producing a reference clock signal; and a counter, operably coupled to the frequency adjustable oscillator, for producing an update signal based on the reference clock signal that directs the memory device to update the chronological information; and a display operably coupled to the memory device, for displaying the chronological information to a user of the radiotelephone communication unit, the display further comprising means for modifying the displayed information to provide an indication to the user as to whether the communication unit is registered in a cellular communication system.

2. The radiotelephone communication unit of claim 1, wherein the chronological information comprises time.

3. The radiotelephone communication unit of claim 1, wherein the chronological information comprises a data.

4. The radiotelephone communication unit according to claim 1, wherein the cellular communication system is selected from the group consisting essentially of:

a personal communication system, a code division multiple access system, a time division multiple access system and a frequency division multiple access system.

5. A radiotelephone communication unit comprising:

a signal receiver receiving a radio communication signal that contains chronological information and receiving a signal carrying voice data, said signal receiver including a frequency adjustable oscillator and a frequency downconverter, said frequency adjustable oscillator supplying a local oscillator signal for the frequency downconverter such that the signal receiver can detect the signal carrying voice data and said frequency adjustable oscillator producing a reference clock signal, said reference clock signal having a different frequency than said local oscillator signal;

a memory device, operably coupled to the signal receiver, for storing the chronological information;

a counter, operably coupled to the frequency adjustable oscillator and the memory device, for producing an update signal by monitoring edges of the reference clock signal that directs the memory device to increment the chronological information; and a display, operably coupled to the memory device, for displaying the chronological information to a user of the communication unit.

* * * * *